United States Patent
Xu et al.

(10) Patent No.: US 11,973,430 B2
(45) Date of Patent: Apr. 30, 2024

(54) CONVERTER ADAPTABLE TO WIDE RANGE OUTPUT VOLTAGE AND CONTROL METHOD THEREOF

(71) Applicant: Delta Electronics (Shanghai) Co., Ltd., Shanghai (CN)

(72) Inventors: Hairui Xu, Shanghai (CN); Haibin Song, Shanghai (CN); Daofei Xu, Shanghai (CN); Jinfa Zhang, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 243 days.

(21) Appl. No.: 17/658,257

(22) Filed: Apr. 7, 2022

(65) Prior Publication Data
US 2022/0385199 A1    Dec. 1, 2022

(30) Foreign Application Priority Data

May 19, 2021    (CN) .......................... 202110547937.0

(51) Int. Cl.
H02M 3/335    (2006.01)
H02M 1/00     (2006.01)

(52) U.S. Cl.
CPC ..... *H02M 3/33592* (2013.01); *H02M 1/0009* (2021.05); *H02M 1/0035* (2021.05); *H02M 1/0058* (2021.05)

(58) Field of Classification Search
CPC .......... H02M 3/33592; H02M 1/0009; H02M 1/0035; H02M 1/0058

USPC ............................................ 363/17; 323/282
See application file for complete search history.

(56) References Cited

U.S. PATENT DOCUMENTS

| | | | |
|---|---|---|---|
| 10,103,634 B2* | 10/2018 | Zeng ................. | H02M 3/33592 |
| 2005/0041439 A1 | 2/2005 | Jang et al. | |
| 2011/0176335 A1* | 7/2011 | Li ....................... | H02M 3/3376 363/21.02 |
| 2016/0181927 A1* | 6/2016 | Chang .................... | H02M 1/42 363/21.02 |
| 2018/0151582 A1 | 5/2018 | Wu et al. | |

FOREIGN PATENT DOCUMENTS

| | | |
|---|---|---|
| CN | 105450028 A | 3/2016 |
| CN | 108206631 A | 6/2018 |
| CN | 110677018 A | 1/2020 |
| TW | 201702785 A | 1/2017 |
| TW | 201717531 A | 5/2017 |

* cited by examiner

*Primary Examiner* — Yemane Mehari
(74) *Attorney, Agent, or Firm* — CKC & Partners Co., LLC

(57) ABSTRACT

The application discloses a converter adaptable to a wide range output voltage and a control method thereof. The converter includes a PWM half-bridge circuit. The control method includes: causing the PWM half-bridge circuit to enter into a DCM by regulating a switching frequency; in each switching period, extending conduction time or turning on a corresponding synchronous rectifier once again for a predetermined time before the first power switch and the second power switch are turned on, to realize zero voltage switching (ZVS) of the first power switch and the second power switch. The application realizes ZVS of the primary power switches, thereby reducing loss.

32 Claims, 6 Drawing Sheets

CONVERTER ADAPTABLE TO WIDE RANGE OUTPUT VOLTAGE AND CONTROL METHOD THEREOF

CROSS-REFERENCE TO RELATED APPLICATIONS

This non-provisional application claims priority under 35 U.S.C. § 119(a) on Patent Application No. 202110547937.0 filed in P.R. China on May 19, 2021, the entire contents of which are hereby incorporated by reference.

Some references, if any, which may include patents, patent applications and various publications, may be cited and discussed in the description of this application. The citation and/or discussion of such references, if any, is provided merely to clarify the description of the present application and is not an admission that any such reference is "prior art" to the application described herein. All references listed, cited and/or discussed in this specification are incorporated herein by reference in their entireties and to the same extent as if each reference was individually incorporated by reference.

FIELD

The invention relates to the field of power electronic converter, and particularly to a converter adaptable to a wide range output voltage and a control method thereof.

BACKGROUND

Recently, USB PD type C techniques are developed rapidly with a higher percentage of market occupancy and a wider application range, such as 5V for charging with the mobile phones, 12V for charging with the routers, 20V for charging with the laptops. To facilitate the various electronics products of consumers, the skilled in the art is devoted to roll out a new adapter, which has the wide-range output voltage and meet with the one-to-many application requirements.

In the conventional power adapter, the rated power of the mainstream is 65 W, and the typical topology of the mainstream usually use a flyback converter. The flyback converter possesses a strong capability for regulating the output voltage, and ensures an output efficiency at a light load to satisfy the standard requirement. However, as a regulation range of the output voltage becomes wider, the power will increase to 200 W or more. Due to energy storage characteristic of inductor, the flyback converter is not suitable to a large power, small size and high power density design.

On the other hand, when the power exceeds 75 W, a PFC circuit stage is introduced to satisfy the harmonic requirement. As for the DC-DC conversion stage, its input voltage has a relatively narrow range, such as home DC micro-grid, on board charging and etc. To address the above shortcomings, the conventional solutions have made many attempts, for example, a two-stage architecture including LLC stage and Buck stage, to satisfy the demand for a large power and wide range output. Though LLC stage can realize a high efficiency and help to the miniaturization design of the adapter, the two-stage architecture still has a poor conversion efficiency at a low output voltage because the operation of the LLC stage as well as the operation of the Buck stage. Finally, the two-stage architecture is very complex and expensive.

SUMMARY

In view of the above, an object of the invention is to provide a method for controlling a converter having a wide range output voltage, which uses a topological architecture of a PWM half-bridge circuit. By regulating turn on time of secondary synchronous rectifier, zero voltage switch (ZVS) of primary power switches can be realized, such that the circuit has advantages of a wide range output voltage regulating capability and a high efficiency at a low voltage output.

To realize the above object, the invention provides a method for controlling a converter suitable for delivering a wide range output voltage to a load, comprising: providing a PWM half-bridge circuit, wherein the PWM half-bridge circuit comprises a primary circuit, a transformer, a secondary rectifier circuit and an output filter circuit, and the primary circuit includes a primary switching bridge arm formed by a first power switch and a second power switch connected in series, and the transformer includes a primary coil coupled to the primary circuit and a secondary coil magnetically coupled to the primary coil, and the secondary rectifier circuit comprises at least two synchronous rectifiers and an input end coupled to the secondary coil, and the output filter circuit having an output inductor and an output capacitor is coupled between an output end of the secondary rectifier circuit and the load; controlling the PWM half-bridge circuit to enter into a discontinuous conduction mode (DCM) by regulating a switching frequency, in each switching period, extending conduction time of the corresponding synchronous rectifier or turning on the corresponding synchronous rectifier once again for a predetermined time before the first power switch or the second power switch are turned on, to realize zero voltage switching (ZVS) of the first power switch and the second power switch.

The invention further provides a converter for delivering a wide range output voltage to a load, comprising a PWM half-bridge circuit and a control unit, the PWM half-bridge circuit comprises a primary circuit comprising a primary switching bridge arm formed by a first power switch and a second power switch connected in series; a transformer comprising a primary coil coupled to the primary circuit and a secondary coil magnetically coupled to the primary coil; a secondary rectifier circuit comprising at least two synchronous rectifiers, and having an input end coupled to the secondary coil; and an output filter circuit comprising an output inductor and an output capacitor, and coupled between an output end of the secondary rectifier circuit and the load, the control unit is configured to control the PWM half-bridge circuit to enter into a discontinuous conduction mode (DCM) by regulating a switching frequency, and in each switching period, the control unit is configured to extend conduction time of the corresponding synchronous rectifier or turn on the corresponding synchronous rectifier once again for a predetermined time before the first power switch or the second power switch are turned on, to achieve zero voltage switching (ZVS) of the first power switch and the second power switch.

The invention realizes zero voltage switching (ZVS) of the primary power switches by controlling the corresponding secondary synchronous rectifier to be continuously turned on or secondly turned on for a predetermined time before the primary power switches of the PWM half-bridge circuit are turned on, thereby reducing switching loss.

Hereinafter the explanations are described in details with reference to the embodiments, and the technical solution of the invention is further explained.

BRIEF DESCRIPTION OF THE DRAWINGS

To make the above and other objects, features, advantages and examples of the invention more apparent, the accompanying drawings are explained as follows.

DETAILED DESCRIPTION

Figure 1:
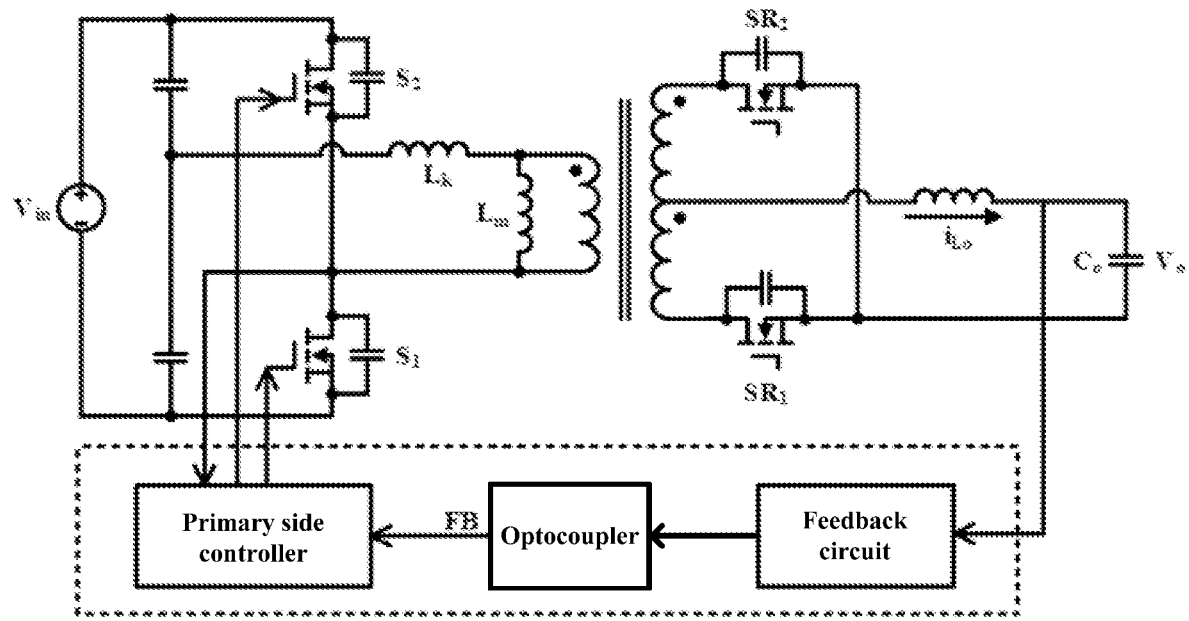
FIG. 1 is a circuit diagram of a conventional PWM half-bridge circuit.

To make descriptions of the invention clearer and complete, the accompanying drawings and various embodiments can be referred, and the same signs in the drawings represent the same or similar components. On the other hand, known components and steps are not described in the embodiments to avoid unnecessary limit to the invention. In addition, to simplify the drawings, some known common structures and elements are illustrated in the drawings in a simple manner.

The inventor found out from research that in the applications involved in the prior art, a new topological architecture based on the PWM half-bridge circuit can realize voltage switching function using the wide range voltage regulating capability of the PWM half-bridge circuit, and also can allow the PWM half-bridge circuit to enter into a discontinuous conduction mode at a low voltage output, thereby improving efficiency at the low voltage output and at a light load of the converter.

Figure 2:
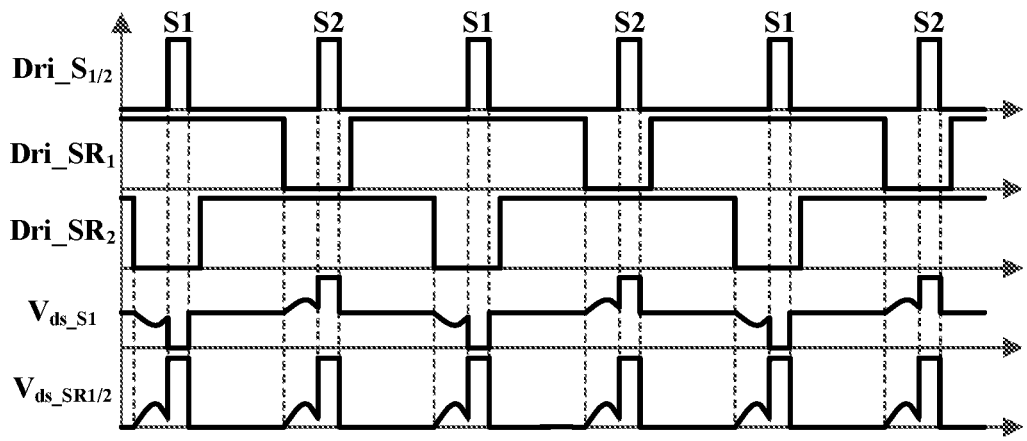
FIG. 2 is operation waveforms of the PWM half-bridge circuit shown in FIG. 1 in a discontinuous conduction mode.

Referring to FIGS. 1-2, the conventional PWM half-bridge circuit, and operation waveforms thereof are shown, and as can be known from FIG. 2, when the PWM half-bridge circuit is operated in a discontinuous conduction mode (DCM), before primary power switches are turned on, oscillation occurs on a voltage across the primary power switch. If using a conventional fixed frequency control, turn-on time of the primary power switch is uncontrollable, and if the primary power switch is turned on when the voltage across the primary power switch reaches a peak, the turn-on voltage is greater than $V_{in}/2$, and loss is large. If using valley control, i.e., the primary power switch is turned on when the voltage across the primary power switch is resonated to a valley, the turn-on voltage is less than $V_{in}/2$, and an turn-on loss is reduced, but an output voltage range is usually wide in many applications. Meanwhile, since the magnetizing inductor $L_m$ is far larger than the output inductor $L_o$, in a case of low voltage output and high voltage input, a ratio of switching loss of the primary power switches is relatively large when load is small, so the effect achieve by valley control is not apparent.

On the basis of the research, according to one embodiment of the invention, a method for controlling a converter adaptable to a wide range output voltage is provided. In the method, before the primary power switches are turned on, a corresponding synchronous rectifier is controlled to be extended conduction time or turned on once again for a period of time and thus a discharging current is generated in an output inductor, when the corresponding synchronous rectifier is turned off, a reverse current is induced in a primary circuit through the discharging current, by making this reverse current participate in the resonance process of the output inductor, a magnetizing inductor of the transformer and a parasitic capacitor of the PWM half-bridge circuit, and turning on the power switch when the voltage across the corresponding primary power switch is resonated to zero, zero voltage switching (ZVS) of the primary power switches are realized, and thus switching loss is reduced.

Specifically, the converter includes a PWM half-bridge circuit and a control unit, and the control unit can be coupled to the PWM half-bridge circuit in a wired or wireless manner. Further, a topological architecture of the PWM half-bridge circuit is used, on one hand, voltage switching function can be realized by using the wide range voltage regulating capability of the PWM half-bridge circuit, and on the other hand, the PWM half-bridge circuit is controlled to operate in a discontinuous conduction mode at a low voltage output, thereby improving efficiency at the low voltage output.

Figure 3:
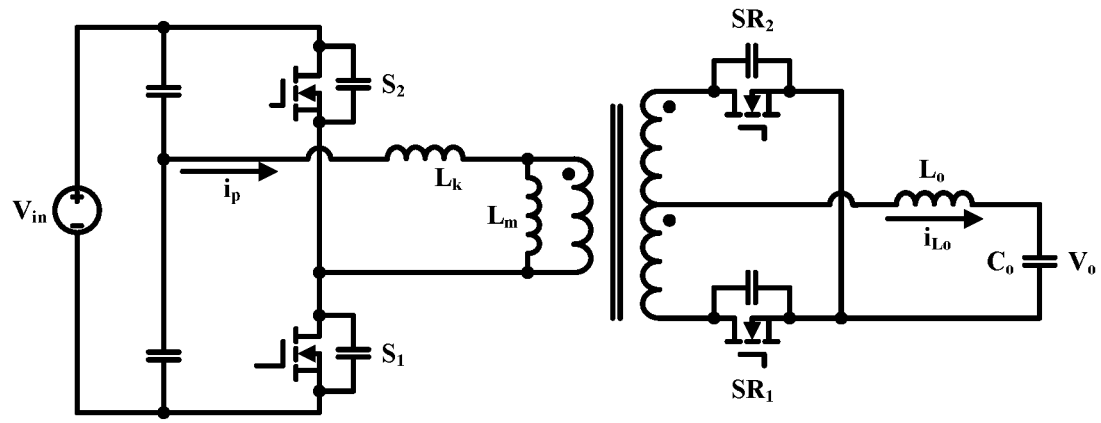
FIG. 3 is a diagram of a PWM half-bridge circuit in a converter adaptable to a wide range output voltage according to a first embodiment of the invention.

Further referring to FIG. 3, the PWM half-bridge circuit includes a primary circuit, a transformer, a secondary rectifier circuit and an output filter circuit. The primary circuit includes a primary switching bridge arm formed by a first power switch $S_1$ and a second power switch $S_2$ connected in series. The transformer includes a primary coil coupled to an output end of the primary circuit, and a secondary coil. The secondary rectifier circuit includes at least two synchronous rectifiers $SR_1$ and $SR_2$, and The secondary rectifier circuit has an input end coupled to the secondary coil. The output filter circuit includes an output inductor $L_o$ and an output capacitor $C_o$, and is coupled between an output end of the secondary rectifier circuit and a load.

It should be noted that the output inductor $L_o$ and the transformer can be integrated together, i.e., integrated in the same magnetic element, thereby reducing a total volume of the magnetic element in the circuit, and improving a power density of the converter. Of course, the output inductor $L_o$ and the transformer also can be separate, and the application is not limited thereto.

Further, in the control method, firstly causing the PWM half-bridge circuit to enter into a discontinuous conduction mode by regulating a switching frequency $f_{sw}$, for example, by reducing the switching frequency $f_{sw}$; and secondly in each switching period, extending conduction time of the corresponding synchronous rectifier or turning on the corresponding synchronous rectifier once again for a predetermined time before the first power switch $S_1$ and the second power switch $S_2$ are turned on, to realize zero voltage switching (ZVS) of the first power switch $S_1$ and the second power switch $S_2$, thereby reducing switching loss.

It should be noted that the parasitic capacitor of the PWM half-bridge circuit can be equivalent by a common parasitic capacitor of the synchronous rectifiers, the first power switch $S_1$, the second power switch $S_2$ and the transformer, and can be equivalent to a parasitic capacitor between a midpoint of the primary switching bridge arm and the ground. The midpoint of the primary switching bridge arm is a junction node between the first power switch $S_1$ and the second power switch $S_2$.

Referring to FIG. 3, the primary circuit further includes a capacitor bridge arm. The capacitor bridge arm is formed by a first capacitor and a second capacitor connected in series. One end of the primary coil of the transformer is coupled to a midpoint of the capacitor bridge arm, and the midpoint of the capacitor bridge arm is a junction node between the first capacitor and the second capacitor. And the other end of the primary coil is coupled to the midpoint of the primary switching bridge arm. The PWM half-bridge circuit of the present disclosure is not limited to a structure in FIG. 3. For example, referring to FIGS. 4 and 5, the primary circuit may further include a capacitor connected to a positive input end or a negative input end of the primary circuit, i.e., one end of the capacitor is coupled to the positive input end or the negative input end of the primary circuit, and the other end of the capacitor is coupled to one end of the primary coil of the transformer, and the other end of the primary coil is coupled to the midpoint of the primary switching bridge arm. It should be noted that the capacitor also can be connected to other positions of the primary circuit, for example, connected between the other end of the primary coil and the midpoint of the primary switching bridge arm.

As shown in FIG. 3, the first power switch $S_1$ is electrically connected to a negative input end of the primary circuit, and the second power switch $S_2$ is electrically connected to a positive input end of the primary circuit. A midpoint voltage of the primary switching bridge arm is detected, when the midpoint voltage of the primary switching bridge arm is less than a first preset voltage, the first power switch $S_1$ is turned on, and when a midpoint voltage of the primary switching bridge arm is greater than a second preset voltage, the second power switch $S_2$ is turned on. The first preset voltage can be a value approximate to zero, and the second preset voltage can be a value approximate to $V_{in}$. Therefore, ZVS function of the first power switch $S_1$ and the second power switch $S_2$ can be realized, which reduces switching loss significantly.

Figure 4:
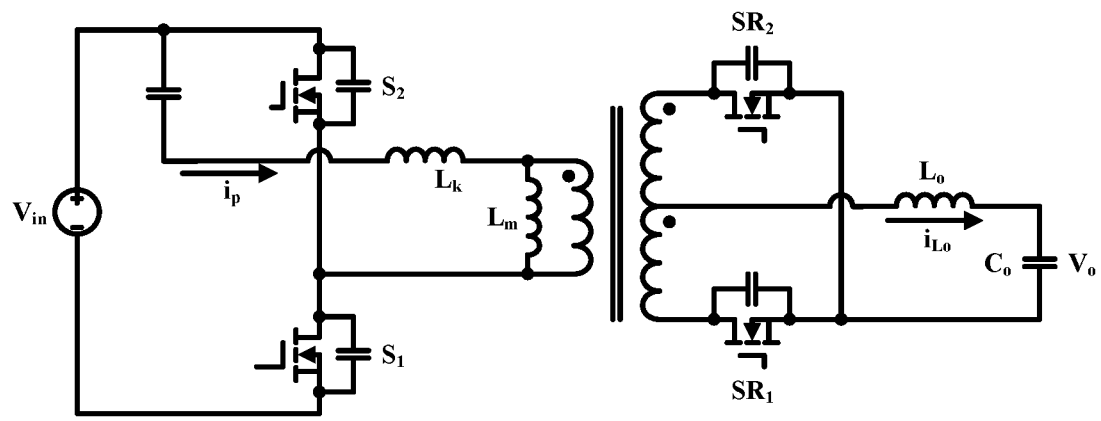
FIG. 4 is a diagram of a PWM half-bridge circuit in a converter adaptable to a wide range output voltage according to a second embodiment of the invention.
Figure 5:
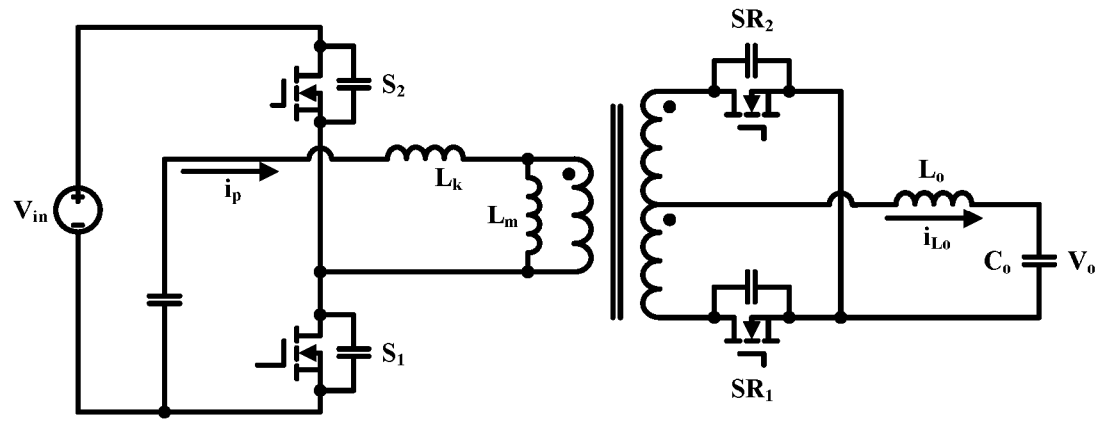
FIG. 5 is a diagram of a PWM half-bridge circuit in a converter adaptable to a wide range output voltage according to a third embodiment of the invention.

The secondary rectifier circuit can be a full wave rectifier circuit or a full bridge rectifier circuit. As shown in FIGS. 3 to 5, when the secondary coil uses a central-tapped structure, i.e., the secondary coil of the transformer has a first end, a second end and a common end, and the secondary rectifier circuit includes a first synchronous rectifier $SR_1$ and a second synchronous rectifier $SR_2$. One end of the first synchronous rectifier $SR_1$ and one end of the second synchronous rectifier $SR_2$ are respectively connected to the first end and the second end of the secondary coil. The other end of the first synchronous rectifier $SR_1$ and the other end of the second synchronous rectifier $SR_2$ are both connected to one end of the output capacitor $C_o$. And one end of the output inductor $L_o$ is electrically connected to the common end of the secondary coil and the other end of the output inductor $L_o$ is electrically connected to the other end of the output capacitor $C_o$.

Figure 6:
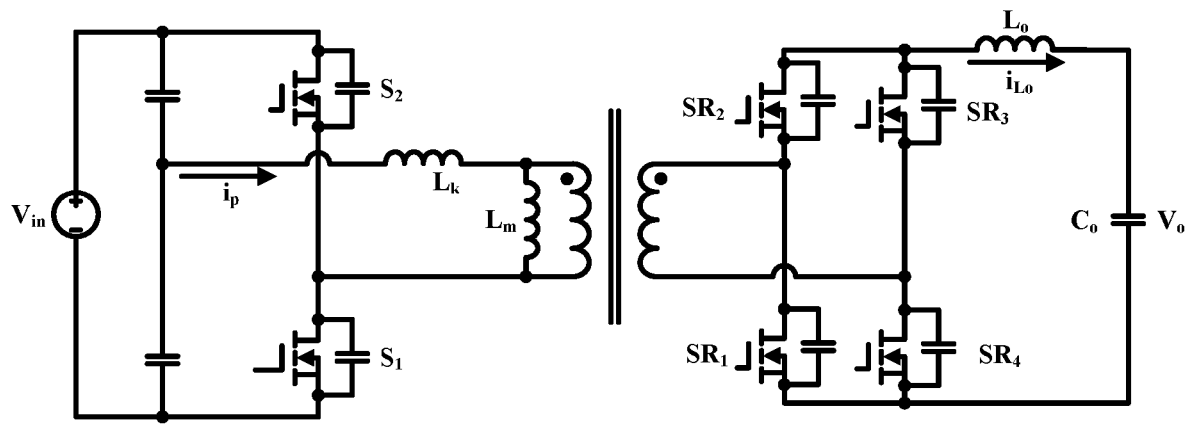
FIG. 6 is a diagram of a PWM half-bridge circuit in a converter adaptable to a wide range output voltage according to a fourth embodiment of the invention.

As shown in FIG. 6, when the secondary rectifier circuit uses a full bridge structure, the secondary coil of the transformer includes a first end and a second end, and the secondary rectifier circuit includes first to fourth synchronous rectifiers $SR_1$ to $SR_4$. In detail, the first synchronous rectifier $SR_1$ and the second synchronous rectifier $SR_2$ are electrically connected in series to form a first rectifier bridge arm, and the third synchronous rectifier $SR_3$ and the fourth synchronous rectifier $SR_4$ are electrically connected in series to form a second rectifier bridge arm. The first end and the second end of the secondary coil are respectively connected to a midpoint of the first rectifier bridge arm and a midpoint of the second rectifier bridge arm, and the output capacitor $C_o$ is connected in parallel to the first rectifier bridge arm and the second rectifier bridge arm through the output inductor $L_o$.

Figure 7:
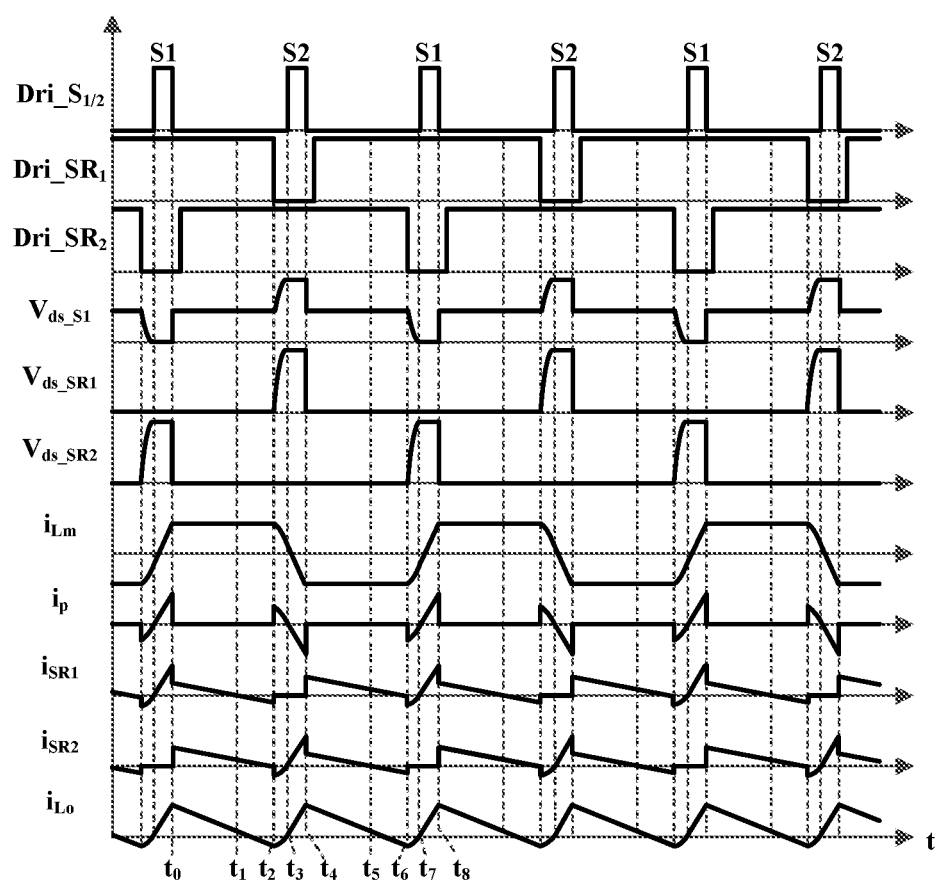
FIG. 7 is operation waveforms of the PWM half-bridge circuit according to the first embodiment of the invention.

According to another exemplary embodiment of the invention, in an interval where switch states of the first power switch $S_1$ and the second power switch $S_2$ are switched, i.e., in a dead time when the two power switches are turned on alternatively, a current flowing through the first synchronous rectifier $SR_1$ and a current flowing through the second synchronous rectifier $SR_2$ are detected, and according to the currents flowing through the synchronous rectifiers, the corresponding synchronous rectifier is controlled to turn off or keep turning on. In one embodiment, as shown in FIG. 7, in a dead time from the first power switch $S_1$ being turned off to the second power switch $S_2$ being turned on, the current flowing through the first synchronous rectifier $SR_1$ is linearly decreased, and when the current is decreased to 0, the first synchronous rectifier $SR_1$ is continuously turned on, and the second synchronous rectifier $SR_2$ is kept in a conduction state. In a dead time from the second power switch $S_2$ being turned off to the first power switch $S_1$ being turned on, the current flowing through the second synchronous rectifier $SR_2$ is linearly decreased, and when the current is decreased to 0, the second synchronous rectifier $SR_2$ is continuously turned on, and the first synchronous rectifier $SR_1$ is kept in a conduction state.

Figure 9:
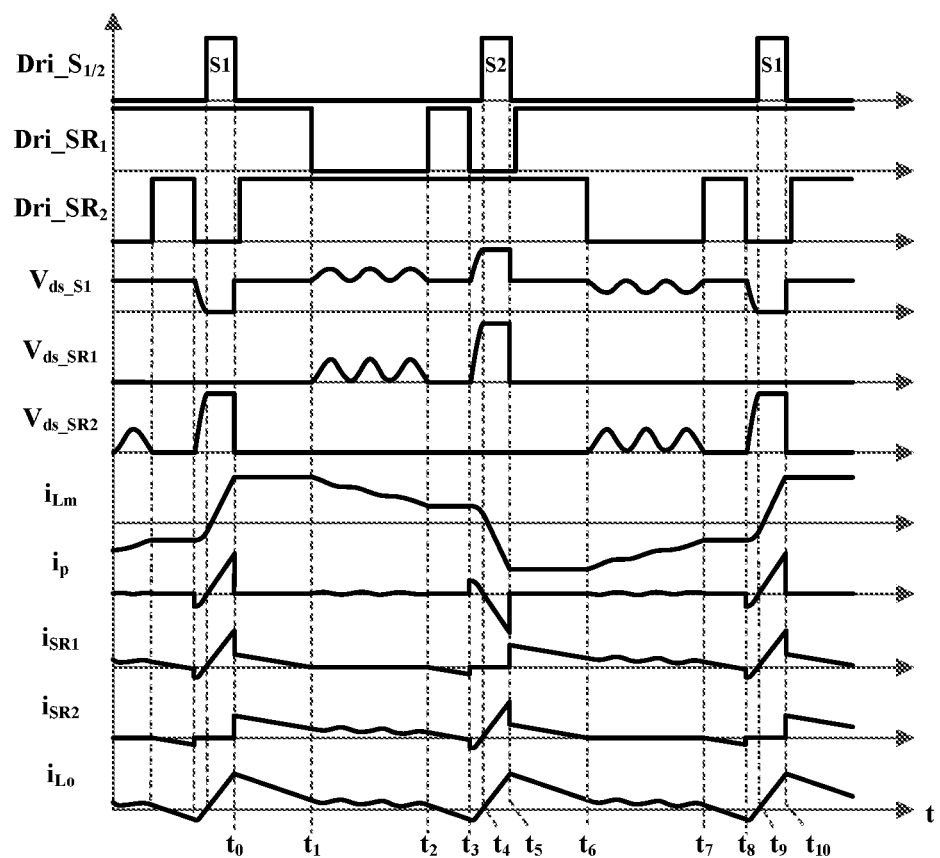
FIG. 9 is operation waveforms of the PWM half-bridge circuit according to the second embodiment of the invention.

In another embodiment, as shown in FIG. 9, in the dead time from the first power switch $S_1$ being turned off to the second power switch $S_2$ being turned on, when the current flowing through the first synchronous rectifier $SR_1$ is decreased to 0, the first synchronous rectifier $SR_1$ is turned off, and the second synchronous rectifier $SR_2$ is kept in a conduction state. Next, the voltage across the first synchronous rectifier $SR_1$ is detected. For example, whether an instant value of a voltage across the first synchronous rectifier $SR_1$ (such as a voltage $V_{DS\_SR1}$ between drain and source electrodes when the first synchronous rectifier $SR_1$ is a MOSFET) reaches a valley value of the waveform is further determined. When the voltage $V_{DS\_SR1}$ between drain and source electrodes of the first synchronous rectifier $SR_1$ is at the m-th valley, the first synchronous rectifier $SR_1$ is controlled to turn on once again, such that the output inductor $L_o$, the magnetizing inductor $L_m$ of the transformer and the parasitic capacitor of the PWM half-bridge circuit form a resonant tank. In the dead time from the second power switch $S_2$ being turned off to the first power switch $S_1$ being turned on, when the current flowing through the second synchronous rectifier $SR_2$ is decreased to 0, the second synchronous rectifier $SR_2$ is turned off, and the first synchronous rectifier $SR_1$ is kept in a conduction state. Next, the voltage across the second synchronous rectifier $SR_2$ is detected. For example, whether an instant value of a voltage across the second synchronous rectifier $SR_2$ (such as a voltage $V_{DS\_SR2}$ between drain and source electrodes when the second synchronous rectifier $SR_2$ is a MOSFET) reaches a valley value of the waveform is further determined. When the voltage $V_{DS\_SR2}$ between drain and source electrodes of the second synchronous rectifier $SR_2$ is at the m-th valley, the second synchronous rectifier $SR_2$ is controlled to turn on once again, such that the output inductor $L_o$, the magnetizing inductor $L_m$ of the transformer and the parasitic capacitor of the PWM half-bridge circuit form a resonant tank. The switching frequency can be further reduced by regulating a duration of the resonance process, thereby reducing switching loss, where m is an integer greater than or equal to 1. It should be noted that a value of m is depending on a size of the load and the switching frequency. If the load is decreased, the value of m is increased, and if the load is increased, the value of m is decreased.

When the load continues to decrease, the PWM half-bridge circuit enters into a BURST mode from the discontinuous conduction mode, and each BURST period includes a pulse enabled interval (Burst on) during which the PWM half-bridge circuit is operated in the discontinuous conduction mode, and a pulse disabled interval (Burst off) during which all pulse signals are stopped, i.e., driving signals of the primary circuit and the secondary rectifier circuit are stopped, such that the PWM half-bridge circuit stops operation.

In some embodiments, in each of the pulse enabled intervals, the first switching period is processed, such that a current $i_{Lm}$ flowing through the magnetizing inductor $L_m$ and a current $i_{Lo}$ flowing through the output inductor $L_o$ access to a predetermined trajectory; and the final switching period is processed, such that a pulse signal of the primary circuit is stopped when the current $i_{Lm}$ flowing through the magnetizing inductor $L_m$ is zero.

Referring to FIGS. 7 and 9, ZVS control can be divided into complementary and non-complementary operating modes according to relation between driving of the synchronous rectifiers and driving of the power switches. In the complementary operating mode, the corresponding synchronous rectifiers are kept in a conduction state in the switch switching interval, and in the non-complementary operating mode, the corresponding synchronous rectifiers are turned on once again in the switch switching interval. Hereinafter the complementary and non-complementary ZVS control manners, and the complementary ZVS control manner when operating in a BURST mode are further described in details by examples with reference to FIGS. 7 to 9. It shall be noted that since leakage inductance $L_k$ of the transformer is far less than the magnetizing inductor $L_m$, influence of the leakage inductance $L_k$ is omitted in the following process.

Firstly, as for the complementary operating mode, as shown in FIG. 7, it illustrates operation waveforms of the PWM half-bridge circuit of FIG. 3.

Phase [$t_0$-$t_1$]:

At time $t_0$, the first power switch $S_1$ is turned off, a voltage $V_{ds\_S1}$ withstood by $S_1$ is changed from 0V to $V_{in}/2$ (wherein $V_{in}$ is an input voltage), a primary current $i_p$ is changed from a peak current $i_{p\_pk}$ to 0 A, the current $i_{Lm}$ flowing through the magnetizing inductor $L_m$ is maintained at a peak current $i_{Lm\_pk}$, a voltage $V_{dS\_SR2}$ withstood by the second synchronous rectifier $SR_2$ is changed from $V_{in}/n$ (where n is a turn ratio of primary and secondary sides of the transformer) to 0, and the second synchronous rectifier $SR_2$ is turned on. At this time, the first synchronous rectifier $SR_1$ is in a conductive state, and the current $i_{Lo}$ flowing through the output inductor $L_o$, a current $i_{SR1}$ flowing through the first synchronous rectifier $SR_1$ and a current $i_{SR2}$ flowing through the second synchronous rectifier $SR_2$ are linearly decreased, until the current $i_{SR1}$ is decreased to 0, and the current $i_{SR2}$ and $i_{Lo}$ are decreased to $n*i_{Lm\_pk}$ at time $t_1$.

Phase [$t_1$-$t_2$]:

At time $t_1$, the current $i_{SR1}$ flowing through the first synchronous rectifier $SR_1$ is decreased to 0, the current $i_{SR2}$ flowing through the second synchronous rectifier $SR_2$ and the current $i_{Lo}$ flowing through the output inductor are decreased to $n*i_{Lm\_pk}$, the first synchronous rectifier $SR_1$ is controlled to kept in a conduction state, and the current $i_{Lo}$ flowing through the output inductor is continued to linearly decrease to generate a discharging current, until the first synchronous rectifier $SR_1$ is turned off at time $t_2$. The duration of phase $t_1$-$t_2$ can be obtained by computation of a control chip.

Phase [$t_2$-$t_3$]:

At time $t_2$, the first synchronous rectifier $SR_1$ is turned off, and the second synchronous rectifier $SR_2$ is still in a conduction state, and a reverse current is generated by the primary circuit, and the reverse current is used for discharging the parasitic capacitor across the second power switch $S_2$ to be turned on. Specifically, the reverse current involves in resonance among the magnetizing inductor $L_m$ of the transformer, the output inductor $L_o$ and the parasitic capacitor of the PWM half-bridge circuit, and at time $t_3$, the voltage withstood by the first power switch $S_1$ is greater than or equal to the second preset voltage, for example, reaching $V_{in}$. At this time, the second power switch $S_2$ is turned on, such that ZVS of $S_2$ can be realized.

Phase [$t_3$-$t_4$]:

At time $t_3$, the second power switch $S_2$ is turned on, and the primary current $i_p$ and the current $i_{Lm}$ flowing through the magnetizing inductor of the transformer are linearly decreased, and the current $i_{Lo}$ flowing through the output inductor is linearly increased, until the primary current $i_p$ reaches a negative peak current $-i_{p\_pk}$ at time $t_4$.

Phase [$t_4$-$t_5$]:

At time $t_4$, the second power switch $S_2$ is turned off, the voltage $V_{ds\_S1}$ withstood by the first power switch $S_1$ is changed from $V_{in}$ to $V_{in}/2$, the primary current $i_p$ is changed from the negative peak current $-i_{p\_pk}$ to 0 A, the current $i_{Lm}$ flowing through the magnetizing inductor is maintained at the negative peak current $-i_{p\_pk}$, the voltage $V_{ds\_SR1}$ withstood by the first synchronous rectifier $SR_1$ is changed from $V_{in}/n$ to 0, and the first synchronous rectifier $SR_1$ is turned on. At this time, the second synchronous rectifier $SR_2$ is still in a conduction state, and the current $i_{Lo}$ flowing through the output inductor, the current $i_{SR1}$ flowing through the first synchronous rectifier $SR_1$ and the current $i_{SR2}$ flowing through the second synchronous rectifier $SR_2$ are linearly decreased, until the current $i_{SR2}$ is decreased to 0, and the current $i_{SR1}$ and $i_{Lo}$ are decreased to $n*i_{Lm\_pk}$ at time $t_5$.

Phase [$t_5$-$t_6$]:

At time $t_5$, the current $i_{SR2}$ flowing through the second synchronous rectifier $SR_2$ is decreased to 0, the current $i_{SR1}$ flowing through the first synchronous rectifier $SR_1$ and the current $i_{Lo}$ flowing through the output inductor are decreased to $n*i_{Lm\_pk}$, the second synchronous rectifier $SR_2$ is controlled to continuously turn on, and the current $i_{Lo}$ flowing through the output inductor is continued to linearly decrease to generate a discharging current, until the second synchronous rectifier $SR_2$ is turned off at time $t_6$. The duration of phase $t_5$-$t_6$ can be obtained by computation of a control chip.

Phase [$t_6$-$t_7$]:

At time $t_6$, the second synchronous rectifier $SR_2$ is turned off, the first synchronous rectifier $SR_1$ is still in a conduction state, and the discharging current of the previous phase makes the primary circuit to generate a reverse current, and the reverse current is used for discharging the parasitic capacitor across the first power switch $S_1$ to be turned on. Specifically, the reverse current involves in resonance among the magnetizing inductor $L_m$ of the transformer, the output inductor $L_o$ and the parasitic capacitor of the PWM half-bridge circuit, and at time $t_7$, the voltage $V_{ds\_S1}$ withstood by the first power switch $S_1$ is less than or equal to the first preset voltage, such as, 0V. At this time, the first power switch $S_1$ is turned on, such that ZVS of the first power switch $S_1$ can be realized.

Phase [$t_7$-$t_8$]:

At time $t_7$, the first power switch $S_1$ is turned on, the primary current $i_p$, the current $i_{Lm}$ flowing through the magnetizing inductor of the transformer and the current $i_{Lo}$ flowing through the output inductor are linearly increased, until the primary current $i_p$ reaches the peak current $i_{p\_pk}$ at time $t_8$, and the first power switch $S_1$ is turned off. Then the process described above is repeated.

It shall be noted that the ZVS control method in the complementary mode of the PWM half-bridge circuit has one precondition, i.e., the circuit must be operated in a non-strict discontinuous conduction mode, i.e., a critical conduction mode, within the whole input voltage range and the whole load range. However, if the PWM half-bridge circuit is operated in the critical conduction mode, light load efficiency at a low voltage output is seriously affected, because when the PWM half-bridge circuit is operated in the critical conduction mode, the switching frequency is inversely proportional to the load, the lighter the load is, the higher the switching frequency will be. Therefore, in the case of a low voltage output and a light load, the switching frequency becomes extremely high, and the increasing switching loss seriously affects efficiency. To solve the problem, the present disclosure provides a complementary ZVS control manner under the BURST mode.

Figure 8:
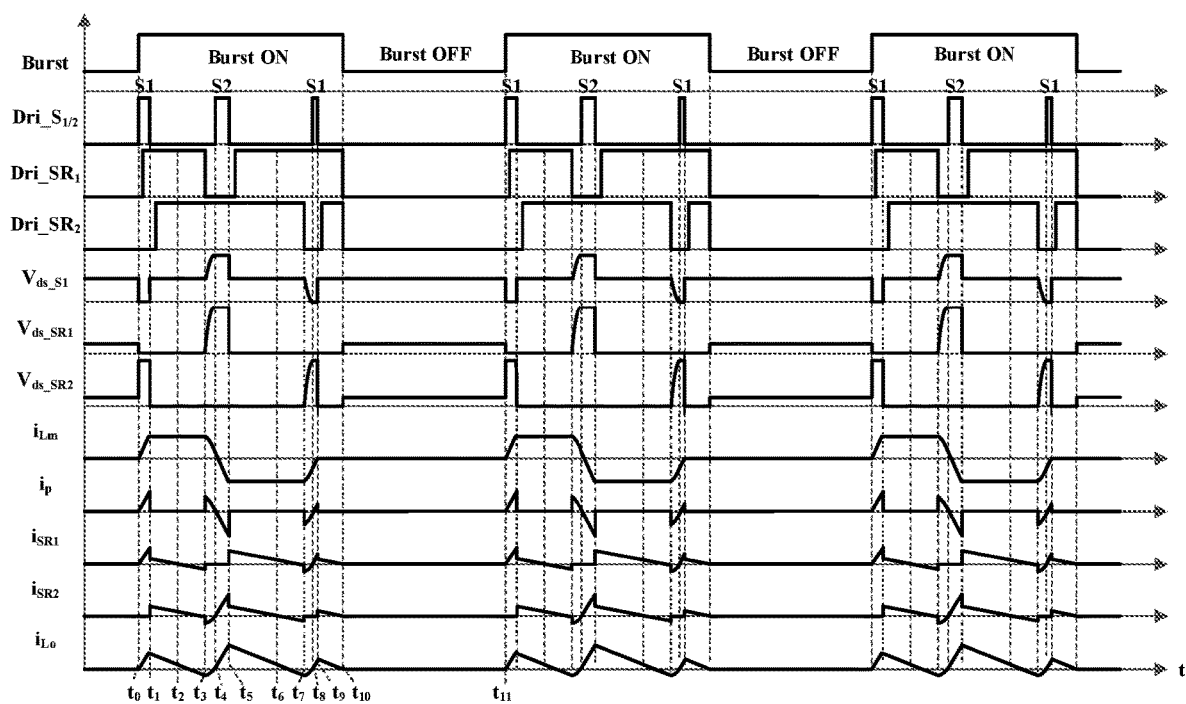
FIG. 8 is operation waveforms when the PWM half-bridge circuit according to the first embodiment of the invention is operated in a BURST mode.

Specifically, as shown in FIG. 8, during Burst ON interval, the first and final switching periods shall be processed, such that the current $i_{Lm}$ flowing through the magnetizing inductor and the current $i_{Lo}$ flowing through the output inductor quickly access to a predetermined trajectory, and after the current $i_{Lm}$ flowing through the magnetizing inductor is zero, driving signals of the primary power switches are stopped, and the PWM half-bridge circuit enters into Burst OFF interval when the current $i_{Lo}$ flowing through the output inductor is decreased to 0, thereby avoiding loss and oscillation. The predetermined trajectory of the current $i_{Lm}$ flowing through the magnetizing inductor and the current $i_{Lo}$ flowing through the output inductor is a trajectory of the current $i_{Lm}$ and the current $i_{Lo}$ in the discontinuous conduction mode described above, respectively. As for the remaining switching periods during Burst ON interval, a frequency and a conduction time can be held constant, but the application is not limited thereto.

Hereinafter the respective control phases are explained in details with reference to operating waveforms of FIG. 8.

Phase [$t_0$-$t_1$]:

At time $t_0$, Burst ON interval is entered, the first power switch $S_1$ is turned on, a voltage $V_{ds\_S1}$ withstood by $S_1$ is changed from $V_{in}/2$ to 0, a voltage $V_{ds\_SR1}$ withstood by the first synchronous rectifier $SR_1$ is changed from $V_o$ to 0, the first synchronous rectifier $SR_1$ is turned on, a voltage $V_{ds\_SR2}$ withstood by the second synchronous rectifier $SR_2$ is changed from $V_o$ to $V_{in}/n$, and a primary current $i_p$, the current $i_{Lm}$ flowing through the magnetizing inductor and the current $i_{Lo}$ flowing through the output inductor are linearly increased from zero, until the current $i_{Lm}$ reaches a peak value at time $t_1$. Since the current $i_{Lm}$ cannot be detected, this period of time can be obtained by computation of a control chip.

Phase [$t_1$-$t_8$]:

At time $t_1$, after the current $i_{Lm}$ and the current $i_{Lo}$ access to the predetermined trajectory, the first power switch $S_1$ is turned off, and an operating process in the period from time $t_1$ to time $t_8$ is the same as that from time $t_0$ to time $t_7$ in FIG. 7, so the details are not described here. In this period of time, the switching frequency and the conduction time are held constant, until the final switching period in the present Burst ON interval arrives at time $t_8$.

Phase [$t_8$-$t_9$]:

At time $t_8$, the first power switch $S_1$ is turned on, the primary current $i_p$, the current $i_{Lm}$ and the current $i_{Lo}$ are linearly increased, until the current $i_{Lm}$ reaches 0 at time $t_9$, and the first power switch $S_1$ is turned off. Similarly, the duration of phase $t_8$-$t_9$ can be obtained by computation.

Phase [$t_9$-$t_{10}$]:

At time $t_9$, the first power switch $S_1$ is turned off, the voltage withstood by $S_1$ is changed from 0 to $V_{in}/2$, the voltage $V_{ds\_SR2}$ withstood by the second synchronous rectifier $SR_2$ is changed from to 0, and the second synchronous rectifier $SR_2$ is turned on. At this time, the first synchronous rectifier $SR_1$ is in a conduction state, the primary current $i_p$ and the current $i_{Lm}$ are maintained at 0, and the current $i_{Lo}$ is linearly decreased, until the current $i_{Lo}$ is decreased to 0 at time $t_{10}$.

Phase [$t_{10}$-$t_{11}$]:

At time $t_{10}$, the current $i_{Lo}$ is decreased to 0, the power switches $S_1$ and $S_2$ are turned off, the synchronous rectifiers $SR_1$ and $SR_2$ are turned off, and the voltages withstood by $SR_1$ and $SR_2$ are changed from 0 to $V_o$, and the Burst OFF interval is entered, until the Burst ON interval is entered again at time $t_{11}$. Then the process described above is repeated.

It should be noted that the first and final switching periods in the Burst ON interval are not necessarily correspond to the first power switch $S_1$, and also can be the second power switch $S_2$, and operating manners are the same.

Further, there are two control manners for a frequency during Burst ON/OFF and the number of switching periods in the Burst ON interval. The first control manner is to fix the number of switching periods in the Burst ON interval, and to regulate the frequency during Burst ON/OFF according to a size of the load. The larger the load is, the higher the frequency will be. On the contrary, the smaller the load is, the lower the frequency will be. The second control manner is to maintain the fixed frequency during Burst ON/OFF, and to regulate the number of switching periods in the Burst ON interval according to the size of the load. The larger the load is, the more the number will be. Otherwise, the smaller the load is, the less the number will be.

As for the non-complementary operating mode, as shown in FIG. 9, operation waveforms of the PWM half-bridge circuit of FIG. 3 in another embodiment is shown.

Phase [$t_0$-$t_1$]:

At time $t_0$, the first power switch $S_1$ is turned off, a voltage $V_{ds\_S1}$ withstood by $S_1$ is changed from 0V to $V_{in}/2$, the primary current $i_p$ is changed from a peak current $i_{p\_pk}$ to 0 A, the current $i_{Lm}$ flowing through the magnetizing inductor $L_m$ is maintained at the peak current $i_{p\_pk}$, a voltage $V_{ds\_SR2}$ withstood by the synchronous rectifier $SR_2$ is changed from $V_{in}/n$ to 0, and the synchronous rectifier $SR_2$ is turned on. At this time, the synchronous rectifier $SR_1$ is in a conduction state, and the current $i_{Lo}$ flowing through the output inductor $L_o$, a current $i_{SR1}$ flowing through the first synchronous rectifier $SR_1$ and a current $i_{SR2}$ flowing through the second synchronous rectifier $SR_2$ are linearly decreased, until the current $i_{SR1}$ is decreased to 0, and the current $i_{SR2}$ and the current $i_{Lo}$ are decreased to $n*i_{Lm\_pk}$ at time $t_1$.

Phase [$t_1$-$t_2$]:

At time $t_1$, the current $i_{SR1}$ flowing through the first synchronous rectifier $SR_1$ is decreased to 0, and the current $i_{SR2}$ flowing through the second synchronous rectifier $SR_2$ and the current $i_{Lo}$ flowing through the output inductor are decreased to $n*i_{Lm\_pk}$. At this time, the first synchronous rectifier $SR_1$ is turned off, the second synchronous rectifier $SR_2$ is still in a conduction state. The output inductor $L_o$ and the magnetizing inductor $L_m$ of the transformer oscillates with the parasitic capacitor of the PWM half-bridge circuit. The voltage $V_{ds\_S1}$ withstood by the first power switch $S_1$ oscillates with $$\left(\frac{V_{in}}{2} + \frac{nL_m V_o}{L_m + n^2 L_o}\right)$$

as the balance point and $$\frac{nL_m V_o}{L_m + n^2 L_o}$$

as the amplitude. the voltage $V_{ds\_SR1}$ withstood by the first synchronous rectifier $SR_1$ oscillates with $$\frac{2L_m V_o}{L_m + n^2 L_o}$$

as the balance point and $$\frac{2L_m V_o}{L_m + n^2 L_o}$$

as the amplitude, and the current $i_{Lo}$ oscillates with a current linearly decreased as the balance point and another specific amplitude. Moreover, the above three oscillation periods are the same, and equal to $$2\pi \sqrt{\frac{n^2 L_m L_o C_{EQ}}{n^2 L_o + L_m}}$$

(wherein $C_{EQ}$ is the parasitic capacitor of the PWM half-bridge circuit). At time $t_2$, the voltage $V_{ds\_SR1}$ across the first synchronous rectifier $SR_1$ is oscillated to the m-th valley. It should be noted that the time $t_1$-$t_2$ can be selected at the m-th valley, the value of m is associated with the load and the switching frequency, and the lower the switching frequency is, or the smaller the load is, the larger the value of m will be. When the load is decreased, quick frequency reduction is realized by increasing the number m of valleys, thereby reducing switching loss, and improving light load efficiency.

Phase $[t_2\text{-}t_3]$:

At time $t_2$, the first synchronous rectifier $SR_1$ is turned on once again, and the current $i_{Lo}$ flowing through the output inductor is linearly decreased to generate a discharging current, until the first synchronous rectifier $SR_1$ is turned off at time $t_3$. The time $t_2$-$t_3$ can be obtained by computation of a control chip.

Phase $[t_3\text{-}t_4]$:

At time $t_3$, the first synchronous rectifier $SR_1$ is turned off, the second synchronous rectifier $SR_2$ is still in a conduction state, and a reverse current is generated by the primary circuit and the reverse current is used for discharging the parasitic capacitor across the second power switch $S_2$ to be turned on. Specifically, the reverse current involves in resonance among the magnetizing inductor $L_m$ of the trans-former, the output inductor $L_o$ and the parasitic capacitor of the PWM half-bridge circuit. At time $t_4$, the voltage $V_{ds\_S1}$ withstood by the first power switch $S_1$ is greater than or equal to the second preset voltage, such as, $V_{in}$. The second power switch $S_2$ is turned on, such that ZVS of $S_2$ can be realized.

Phase $[t_4\text{-}t_5]$:

At time $t_4$, the second power switch $S_2$ is turned on, the primary current $i_p$ and the current $i_{Lm}$ are linearly decreased, and the current $i_{Lo}$ is linearly increased, until the primary current $i_p$ reaches a negative peak current $-i_{p\_pk}$ at time $t_5$.

Phase $[t_5\text{-}t_6]$:

At time $t_5$, the second power switch $S_2$ is turned off, the voltage $V_{ds\_S1}$ withstood by the first power switch $S_1$ is changed from $V_{in}$ to $V_{in}/2$. The primary current $i_p$ is changed from the negative peak current $-i_{p\_pk}$ to 0 A, the current $i_{Lm}$ is maintained at the negative peak current $-i_{p\_pk}$, the voltage withstood by the first synchronous rectifier $SR_1$ is changed from $V_{in}/n$ to 0, and $SR_1$ is turned on. At this time, the second synchronous rectifier $SR_2$ is in a conduction state, and the current $i_{Lo}$ flowing through the output inductor, the current $i_{SR1}$ flowing through the first synchronous rectifier $SR_1$ and the current $i_{SR2}$ flowing through the second synchronous rectifier $SR_2$ are linearly decreased, until the current $i_{SR2}$ is decreased to 0, and the current $i_{SR1}$ and the current $i_{Lo}$ are decreased to $n*i_{Lm\_pk}$ at time $t_6$.

Phase $[t_6\text{-}t_7]$:

At time $t_6$, the current $i_{SR2}$ flowing through the second synchronous rectifier $SR_2$ is decreased to 0, and the current $i_{SR1}$ flowing through the first synchronous rectifier $SR_1$ and the current $i_{Lo}$ flowing through the output inductor are decreased to $n*i_{Lm\_pk}$. At this time, the second synchronous rectifier $SR_2$ is turned off, the first synchronous rectifier $SR_1$ is still in a conduction state, and the output inductor $L_o$ and the magnetizing inductor $L_m$ of the transformer oscillate with the parasitic capacitor, the voltage $V_{ds\_S1}$ withstood by the first power switch $S_1$ oscillates with $$\left(\frac{V_{in}}{2} - \frac{nL_m V_o}{L_m + n^2 L_o}\right)$$

as the balance point and $$\frac{nL_m V_o}{L_m + n^2 L_o}$$

as the amplitude, the voltage $V_{ds\_SR2}$ withstood by the second synchronous rectifier $SR_2$ oscillates with $$\frac{2L_m V_o}{L_m + n^2 L_o}$$

as the balance point and $$\frac{2L_m V_o}{L_m + n^2 L_o}$$

as the amplitude, and the current $i_{Lo}$ oscillates with a current linearly decreased as the balance point and another specific amplitude. Moreover, the above three oscillation periods are the same, and equal to $$2\pi\sqrt{\frac{n^2 L_m L_o C_{EQ}}{n^2 L_o + L_m}}.$$

At time $t_7$, the voltage $V_{ds\_SR2}$ across the second synchronous rectifier $SR_2$ is oscillated to the m-th valley. Similarly, when the load is decreased, quick frequency reduction is realized by increasing the number m of valleys in the period of time $t_6$-$t_7$, thereby reducing switching loss, and improving light load efficiency.

Phase [$t_7$-$t_8$]:

At the time $t_7$, the second synchronous rectifier $SR_2$ is turned on once again, and the current $i_{Lo}$ flowing through the output inductor is linearly decreased to generate a discharging current, until the second synchronous rectifier $SR_2$ is turned off at time $t_8$. Similarly, the time $t_7$-$t_8$ can be obtained by computation of a control chip.

Phase [$t_8$-$t_9$]:

At the time $t_8$, the second synchronous rectifier $SR_2$ is turned off, the first synchronous rectifier $SR_1$ is still in a conduction state, and the primary circuit generates a reverse current and the generated reverse current is used for discharging the parasitic capacitor across the first power switch $S_1$ to be turned on. Specifically, the reverse current involves in resonance among the magnetizing inductor $L_m$ of the transformer, the output inductor $L_o$ and the parasitic capacitor of the PWM half-bridge circuit. And at time $t_9$, the voltage $V_{ds\_S1}$ withstood by the first power switch $S_1$ is less than or equal to the first preset voltage, such as, 0V. At this time, the first power switch $S_1$ is turned on, such that ZVS of $S_1$ can be realized.

Phase [$t_9$-$t_{10}$]:

At time $t_9$, the first power switch $S_1$ is turned on, the primary current $i_p$, the magnetizing current $i_{Lm}$ flowing through the transformer and the current $i_{Lo}$ are linearly increased, until the primary current $i_p$ reaches the peak current $i_{p\_pk}$ at time $t_{10}$, and the first power switch $S_1$ is turned off. Then the process described above is repeated.

According to another embodiment of the invention, ZVS control in the complementary and non-complementary modes also can be applied to the PWM half-bridge circuit as shown in FIG. 6. And the secondary side of FIG. 6 is a full bridge rectifier circuit. The first synchronous rectifier $SR_1$ and the third synchronous rectifier $SR_2$ operate synchronously, and the second synchronous rectifier $SR_2$ and the fourth synchronous rectifier $SR_4$ operate synchronously.

In the complementary mode, the first power switch $S_1$ is turned off, the first synchronous rectifier $SR_1$ and the third synchronous rectifier $SR_2$ are controlled to turn on, the current $i_{SR1}$ flowing through the first synchronous rectifier $SR_1$, the current $i_{SR2}$ flowing through the second synchronous rectifier $SR_2$, the current $i_{SR3}$ flowing through the third synchronous rectifier $SR_3$, and the current $i_{SR4}$ flowing through the fourth synchronous rectifier $SR_4$ are linearly decreased, until the current $i_{SR2}$ and the current $i_{SR4}$ are decreased to 0, and the second synchronous rectifier $SR_2$ and the fourth synchronous rectifier $SR_4$ are controlled to continuously turn on for a predetermined time to realize ZVS of the second power switch $S_2$. Similarly, the second power switch $S_2$ is turned off, the second synchronous rectifier $SR_2$ and the fourth synchronous rectifier $SR_4$ are controlled to turn on, the current $i_{SR1}$ flowing through the first synchronous rectifier $SR_1$, the current $i_{SR2}$ flowing through the second synchronous rectifier $SR_2$, the current $i_{SR3}$ flowing through the third synchronous rectifier $SR_3$, and the current $i_{SR4}$ flowing through the fourth synchronous rectifier $SR_4$ are linearly decreased, until the current $i_{SR1}$ and the current $i_{SR3}$ are decreased to 0, and the first synchronous rectifier $SR_1$ and the third synchronous rectifier $SR_3$ are controlled to continuously turn on for a predetermined time to realize ZVS of the first power switch $S_1$.

In the non-complementary mode, the first power switch $S_1$ is turned off, the first synchronous rectifier $SR_1$ and the third synchronous rectifier $SR_3$ are controlled to turn on, the current $i_{SR1}$ flowing through the first synchronous rectifier $SR_1$, the current $i_{SR2}$ flowing through the second synchronous rectifier $SR_2$, the current $i_{SR3}$ flowing through the third synchronous rectifier $SR_3$, and the current $i_{SR4}$ flowing through the fourth synchronous rectifier $SR_4$ are linearly decreased, until the current $i_{SR2}$ and the current $i_{SR4}$ are decreased to 0, and the second synchronous rectifier $SR_2$ and the fourth synchronous rectifier $SR_4$ are turned off, oscillation occurs among the output inductor $L_o$, the magnetizing inductor $L_m$ of the transformer and the parasitic capacitor of the PWM half-bridge circuit. When the voltage $V_{ds\_SR2}$ across the second synchronous rectifier $SR_2$ and a voltage $V_{ds\_SR4}$ across the fourth synchronous rectifier $SR_4$ are oscillated to the m-th valley, the second synchronous rectifier $SR_2$ and the fourth synchronous rectifier $SR_4$ are controlled to turn on once again for a predetermined time to realize ZVS of the second power switch $S_2$. Similarly, the second power switch $S_2$ is turned off, the second synchronous rectifier $SR_2$ and the fourth synchronous rectifier $SR_4$ are controlled to turn on, the current $i_{SR1}$ flowing through the first synchronous rectifier $SR_1$, the current $i_{SR2}$ flowing through the second synchronous rectifier $SR_2$, the current $i_{SR3}$ flowing through the third synchronous rectifier $SR_3$, and the current $i_{SR4}$ flowing through the fourth synchronous rectifier $SR_4$ are linearly decreased, until the current $i_{SR1}$ and the current $i_{SR3}$ are decreased to 0, the first synchronous rectifier $SR_1$ and the third synchronous rectifier $SR_3$ are turned off, oscillation occurs among the output inductor $L_o$, the magnetizing inductor $L_m$ of the transformer and the parasitic capacitor of the PWM half-bridge circuit. When the voltage $V_{ds\_SR1}$ across the first synchronous rectifier $SR_1$ and a voltage $V_{ds\_SR3}$ across the third synchronous rectifier $SR_3$ are oscillated to the m-th valley, the first synchronous rectifier $SR_1$ and the third synchronous rectifier $SR_3$ are controlled to turn on once again for a predetermined time to realize ZVS of the first power switch $S_1$.

According to another embodiment of the invention, the present disclosure further provides a converter adaptable to a wide range output voltage. The converter includes a PWM half-bridge circuit. The PWM half-bridge circuit includes a primary circuit, a transformer, a secondary rectifier circuit, an output filter circuit and a control unit. The primary circuit includes a primary switching bridge arm formed by a first power switch $S_1$ and a second power switch $S_2$ connected in series. The transformer includes a primary coil coupled to an input end of the primary circuit, and a secondary coil magnetically coupled to the primary coil. The secondary rectifier circuit includes at least two synchronous rectifiers, and has an input end coupled to the secondary coil. The output filter circuit includes an output inductor and an output capacitor, and coupled between an output end of the secondary rectifier circuit and a load. The control unit is configured to control the PWM half-bridge circuit to enter into a discontinuous conduction mode by regulating a switching frequency (e.g., reducing a switching frequency), and configured to extend conduction time or turn on the corresponding synchronous rectifier once again for a predetermined time in each switching period before the first power switch $S_1$ and the second power switch $S_2$ are turned on, to realize ZVS of the first power switch $S_1$ and the second power switch $S_2$. It is understood by a person having ordinary skill in the art ("POSITA") that, in some embodiments, the PWM half-bridge circuit works in the discontinuous conduction mode at a light load, and in some other embodiments, the PWM half-bridge circuit works in the continuous conduction mode at a heavy load, and in some embodiments, the PWM half-bridge circuit works in the discontinuous conduction mode at a full-range load. Here, the full-range load includes a phase of the light load and a phase of the heavy load.

The secondary coil of the transformer is a central-tapped structure, and includes a first end, a second end and a common end. The secondary rectifier circuit includes a first synchronous rectifier $SR_1$ and a second synchronous rectifier $SR_2$, one end of the first synchronous rectifier $SR_1$ and one end of the second synchronous rectifier $SR_2$ are respectively connected to the first end and the second end of the secondary coil, and the other end of the first synchronous rectifier $SR_1$ and the other end of the second synchronous rectifier $SR_2$ are connected to one end of the output capacitor, and one end of the output inductor is connected to the common end of the secondary coil and the other end of the output inductor is connected to the other end of the output capacitor.

According to another embodiment of the invention, the converter further includes a current detection unit for detecting a current flowing through the first synchronous rectifier $SR_1$ and a current flowing through the second synchronous rectifier $SR_2$. The control unit is further configured to receive a detection result from the current detection unit, and in a first dead time from the first power switch $S_1$ being turned off to the second power switch $S_2$ being turned on, when the current flowing through the first synchronous rectifier $SR_1$ is decreased to 0, continuously turn on the first synchronous rectifier $SR_1$ for the predetermined time; in a second dead time from the second power switch $S_2$ being turned off to the first power switch $S_1$ being turned on, when the current flowing through the second synchronous rectifier $SR_2$ is decreased to 0, continuously turn on the second synchronous rectifier $SR_2$ for the predetermined time.

According to another embodiment of the invention, the converter further includes a current detection unit for detecting a current flowing through the first synchronous rectifier $SR_1$ and a current flowing through the second synchronous rectifier $SR_2$. The control unit is further configured to receive a detection result from the current detection unit, and in a first dead time from the first power switch $S_1$ being turned off to the second power switch $S_2$ being turned on, when the current flowing through the first synchronous rectifier $SR_1$ is decreased to 0, turn off the first synchronous rectifier $SR_1$, and keep the second synchronous rectifier $SR_2$ in a conduction state; in a second dead time from the second power switch $S_2$ being turned off to the first power switch $S_1$ being turned on, when the current flowing through the second synchronous rectifier $SR_2$ is decreased to 0, turn off the second synchronous rectifier $SR_2$, and keep the first synchronous rectifier $SR_1$ in a conduction state.

Further, the converter further includes a secondary voltage detection unit for detecting whether an instant value of voltages across the first synchronous rectifier $SR_1$ and the second synchronous rectifier $SR_2$ (for example, a voltage between drain and source electrodes of the MOSFET) reaches a valley value of the waveform. When the voltage across the first synchronous rectifier $SR_1$ is oscillated to the m-th valley, the control unit controls the first synchronous rectifier $SR_1$ to turn on once again, and when the voltage across the second synchronous rectifier $SR_2$ is oscillated to the m-th valley, the control unit controls the second synchronous rectifier $SR_2$ to turn on once again, where m is an integer greater than or equal to 1.

According to another embodiment of the invention, the secondary coil of the transformer includes a first end and a second end, the secondary rectifier circuit includes first to fourth synchronous rectifiers $SR_1$ to $SR_4$, the first synchronous rectifier $SR_1$ and the second synchronous rectifier $SR_2$ are connected in series to form a first rectifier bridge arm, the third synchronous rectifier $SR_3$ and the fourth synchronous rectifier $SR_4$ are connected in series to form a second rectifier bridge arm. The first end and the second end of the secondary coil are respectively connected to midpoints of the first rectifier bridge arm and the second rectifier bridge arm, and the output capacitor $C_o$ is connected in parallel to the first rectifier bridge arm and the second rectifier bridge arm through the output inductor $L_o$.

Corresponding to the complementary mode, the converter further includes a current detection unit for detecting currents flowing through the first synchronous rectifier $SR_1$, the second synchronous rectifier $SR_2$, the third synchronous rectifier $SR_3$ and the fourth synchronous rectifier $SR_4$. The control unit is further configured to receive a detection result from the current detection unit, control the first synchronous rectifier $SR_1$ and the third synchronous rectifier $SR_3$ to operate synchronously, and control the second synchronous rectifier $SR_2$ and the fourth synchronous rectifier $SR_4$ to operate synchronously. In a first dead time from the first power switch $S_1$ being turned off to the second power switch $S_2$ being turned on, the control unit is configured to control the first synchronous rectifier $SR_1$ and the third synchronous rectifier $SR_3$ to turn on, and when the currents flowing through the second synchronous rectifier $SR_2$ and the fourth synchronous rectifier $SR_4$ are decreased to 0, keep the second synchronous rectifier $SR_2$ and the fourth synchronous rectifier $SR_4$ in a conduction state for the predetermined time. And in a second dead time from the second power switch $S_2$ being turned off to the first power switch $S_1$ being turned on, the control unit is configured to control the second synchronous rectifier $SR_2$ and the fourth synchronous rectifier $SR_4$ to turn on, and when the currents flowing through the first synchronous rectifier $SR_1$ and the third synchronous rectifier $SR_3$ are decreased to 0, keep the first synchronous rectifier $SR_1$ and the third synchronous rectifier $SR_3$ in a conduction state for the predetermined time.

Corresponding to the non-complementary mode, the converter further includes a current detection unit for detecting currents flowing through the first synchronous rectifier $SR_1$, the second synchronous rectifier $SR_2$, the third synchronous rectifier $SR_3$ and the fourth synchronous rectifier $SR_4$. The control unit is further configured to receive a detection result from the current detection unit, control the first synchronous rectifier $SR_1$ and the third synchronous rectifier $SR_3$ to operate synchronously, and control the second synchronous rectifier $SR_2$ and the fourth synchronous rectifier $SR_4$ to operate synchronously; in the first dead time from the first power switch $S_1$ being turned off to the second power switch $S_2$ being turned on, control the first synchronous rectifier $SR_1$ and the third synchronous rectifier $SR_3$ to turn on, and when the currents on the second synchronous rectifier $SR_2$ and the fourth synchronous rectifier $SR_4$ are decreased to 0, turn off the second synchronous rectifier $SR_2$ and the fourth synchronous rectifier $SR_4$, such that oscillation occurs among the output inductor $L_o$, the magnetizing inductor $L_m$ of the transformer and the parasitic capacitor of the PWM half-bridge circuit, and when the voltage $V_{ds\_SR2}$ across the second synchronous rectifier $SR_2$ and the voltage $V_{ds\_SR4}$ across the fourth synchronous rectifier $SR_4$ are oscillated to the m-th valley, the second synchronous rectifier $SR_2$ and the fourth synchronous rectifier $SR_4$ are controlled to turn on once again for the predetermined time to realize ZVS of the second power switch $S_2$; and in the second dead time from the second power switch $S_2$ being turned off to the first power switch being $S_1$ turned on, control the second synchronous rectifier $SR_2$ and the fourth synchronous rectifier $SR_4$ to turn on, and when the currents flowing through the first synchronous rectifier $SR_1$ and the third synchronous rectifier $SR_3$ are decreased to 0, turn off the first synchronous rectifier $SR_1$ and the third synchronous rectifier $SR_3$, such that oscillation occurs among the output inductor $L_o$, the magnetizing inductor $L_m$ of the transformer and the parasitic capacitor of the PWM half-bridge circuit, and when the voltage $V_{ds\_SR1}$ across the first synchronous rectifier $SR_1$ and the voltage $V_{ds\_SR3}$ across the third synchronous rectifier $SR_3$ are oscillated to the m-th valley, the first synchronous rectifier $SR_1$ and the third synchronous rectifier $SR_3$ are controlled to turn on once again for the predetermined time to realize ZVS of the first power switch $S_1$, where m is an integer greater than or equal to 1.

When the load is further decreased, the control unit is configured to control the PWM half-bridge circuit to enter into a BURST mode from the discontinuous conduction mode, and each BURST period includes a pulse enabled interval during which the PWM half-bridge circuit is operated in the discontinuous conduction mode, and a pulse disabled interval during which all pulse signals are stopped, such that the PWM half-bridge circuit stops operation.

Further, in each of the pulse enabled intervals, the first switching period is processed, such that a current flowing through the magnetizing inductor and a current flowing through the output inductor access to a predetermined trajectory, and the final switching period is processed, such that a pulse signal of the primary circuit is stopped when the current flowing through the magnetizing inductor is zero.

It should be noted that the predetermined trajectory is a trajectory of the current flowing through the magnetizing inductor and the current flowing through the output inductor in the discontinuous conduction mode.

The converter further includes a primary voltage detection unit for detecting a midpoint voltage of the primary switching bridge arm, and outputting a detection result to the control unit. The first power switch $S_1$ is connected to a negative input end of the primary circuit, the second power switch $S_2$ is connected to a positive input end of the primary circuit, when the midpoint voltage of the primary switching bridge arm is less than or equal to a first preset voltage, the control unit turns on the first power switch $S_1$, and when the midpoint voltage of the primary switching bridge arm is greater than or equal to a second preset voltage, the control unit turns on the second power switch $S_2$. The first preset voltage can be a value approximate to or equal to zero, and the second preset voltage can be a value approximate to or equal to an input voltage.

The present disclosure controls the corresponding synchronous rectifier to extend conduction time or turn on once again for a period of time before the primary power switches are turned on, so as to generate a discharging current in the output inductor, and a reverse current is generated in the primary circuit after the corresponding synchronous rectifier is turned off, and makes the reverse current involve in resonance among the output inductor, the magnetizing inductor of the transformer and the parasitic capacitor of the PWM half-bridge circuit, so that ZVS of the primary power switching tubes can be realized and loss can be reduced.

Although the invention has been disclosed in the embodiments, the invention is not limited thereto. Any skilled in the art shall make various changes and modifications without departing from spirit and scope of the invention, so the protection scope of the invention shall be determined by the scope defined by the appended claims.

What is claimed is:

1. A method for controlling a converter suitable for delivering a wide range output voltage to a load, comprising: providing a PWM half-bridge circuit, wherein the PWM half-bridge circuit comprises a primary side circuit, a transformer, a secondary side rectifier circuit and an output filter circuit, and the primary side circuit includes a primary switching bridge arm formed by a first power switch and a second power switch connected in series, and the transformer includes a primary side coil coupled to the primary side circuit and a first secondary coil and a second secondary coil magnetically coupled to the primary coil, and the secondary rectifier circuit comprises at least two synchronous rectifiers and an input end coupled to the secondary coil, and the output filter circuit having an output inductor and an output capacitor is coupled between an output end of the secondary rectifier circuit and the load; controlling the PWM half-bridge circuit to enter into a discontinuous conduction mode (DCM) by regulating a switching frequency; wherein in each switching period, extending conduction time of the corresponding synchronous rectifier or turning on the corresponding synchronous rectifier once again for a predetermined time before the first power switch or the second power switch are turned on, to realize zero voltage switching (ZVS) of the first power switch and the second power switch.

2. The method according to claim 1, wherein the secondary coil of the transformer is a central-tapped structure, and the secondary coil comprises a first end, a second end and a common end, and the secondary rectifier circuit comprises a first synchronous rectifier and a second synchronous rectifier, one end of the first synchronous rectifier and one end of the second synchronous rectifier are connected to the first end and the second end of the secondary coil respectively, the other end of the first synchronous rectifier and the other end of the second synchronous rectifier are both connected to one end of the output capacitor, and one end of the output inductor is electrically connected to the common end of the secondary coil and the other end of the output inductor is electrically connected to the other end of the output capacitor.

3. The method according to claim 2, further comprising:
controlling the first power switch and the second synchronous rectifier to perform complementary operation, and controlling the second power switch and the first synchronous rectifier to perform complementary operation;
in a first dead time from the first power switch being turned off to the second power switch being turned on, when a current flowing through the first synchronous rectifier is decreased to 0, keep the first synchronous rectifier in a conduction state for the predetermined time; and
in a second dead time from the second power switch being turned off to the first power switch being turned on, when a current flowing through the second synchronous rectifier is decreased to 0, keep the second synchronous rectifier in a conduction state for the predetermined time.

4. The method according to claim 2, further comprising:
controlling the first power switch and the second synchronous rectifier to perform non-complementary operation, and controlling the second power switch and the first synchronous rectifier to perform non-complementary operation;
in a first dead time from the first power switch being turned off to the second power switch being turned on, when a current flowing through the first synchronous rectifier is decreased to 0, turning off the first synchronous rectifier while keeping the second synchronous rectifier in a conduction state; and
in a second dead time from the second power switch being turned off to the first power switch being turned on, when a current flowing through the second synchronous rectifier is decreased to 0, turning off the second synchronous rectifier while keeping the first synchronous rectifier in a conduction state.

5. The method according to claim 4, further comprising:
in the first dead time, further detecting a voltage across the first synchronous rectifier, and turning on the first synchronous rectifier once again for the predetermined time when the voltage across the first synchronous rectifier reaches the m-th valley; and
in the second dead time, further detecting a voltage across the second synchronous rectifier, and turning on the second synchronous rectifier once again for the predetermined time when the voltage across the second synchronous rectifier reaches the n-th valley, where m is an integer greater than or equal to 1, n is an integer greater than or equal to 1.

6. The method according to claim 1, wherein the secondary coil of the transformer comprises a first end and a second end, the secondary rectifier circuit comprises first to fourth synchronous rectifiers, the first synchronous rectifier and the second synchronous rectifier are connected in series to form a first rectifier bridge arm, the third synchronous rectifier and the fourth synchronous rectifier are connected in series to form a second rectifier bridge arm, the first end and the second end of the secondary coil are connected to a midpoint of the first rectifier bridge arm and a midpoint of the second rectifier bridge arm respectively, and the output capacitor is connected in parallel to both ends of the first rectifier bridge arm and the second rectifier bridge arm through the output inductor.

7. The method according to claim 6, further comprising:
controlling the first synchronous rectifier and the third synchronous rectifier to operate synchronously, and controlling the second synchronous rectifier and the fourth synchronous rectifier to operate synchronously;
in a first dead time from the first power switch being turned off to the second power switch being turned on, turning on the first synchronous rectifier and the third synchronous rectifier, and when currents flowing through the second synchronous rectifier and the fourth synchronous rectifier are decreased to 0, keeping the second synchronous rectifier and the fourth synchronous rectifier in a conduction state for the predetermined time; and
in a second dead time from the second power switch being turned off to the first power switch being turned on, turning on the second synchronous rectifier and the fourth synchronous rectifier, and when currents flowing through the first synchronous rectifier and the third synchronous rectifier are decreased to 0, keeping the first synchronous rectifier and the third synchronous rectifier in a conduction state for the predetermined time.

8. The method according to claim 6, further comprising:
controlling the first synchronous rectifier and the third synchronous rectifier to operate synchronously, and controlling the second synchronous rectifier and the fourth synchronous rectifier to operate synchronously;
in a first dead time from the first power switch being turned off to the second power switch being turned on, turning on the first synchronous rectifier and the third synchronous rectifier, and when currents flowing through the second synchronous rectifier and the fourth synchronous rectifier are decreased to 0, turning off the second synchronous rectifier and the fourth synchronous rectifier; and
in a second dead time from the second power switch being turned off to the first power switch being turned on, turning on the second synchronous rectifier and the fourth synchronous rectifier, and when currents flowing through the first synchronous rectifier and the third synchronous rectifier are decreased to 0, turning off the first synchronous rectifier and the third synchronous rectifier.

9. The method according to claim 8, further comprising:
in the first dead time, further detecting the voltage across the second synchronous rectifier or the voltage across the fourth synchronous rectifier, and turning on the second synchronous rectifier and the fourth synchronous rectifier once again for the predetermined time when the voltage across the second synchronous rectifier or the voltage across the fourth synchronous rectifier reaches the m-th valley; and
in the second dead time, further detecting the voltage across the first synchronous rectifier or the voltage across the third synchronous rectifier, and turning on the first synchronous rectifier and the third synchronous rectifier once again for the predetermined time when the voltages across the first synchronous rectifier or the voltage across the third synchronous rectifier reaches the n-th valley, where m is an integer greater than or equal to 1, n is an integer greater than or equal to 1.

10. The method according to claim 1, further comprising:
when the load is further decreased, controlling the PWM half-bridge circuit to enter into a BURST mode from the discontinuous conduction mode (DCM), wherein each BURST period comprises a pulse enabled interval during which the PWM half-bridge circuit operates in the DCM, and a pulse disabled interval during which all pulse signals are stopped and the PWM half-bridge circuit stops operation.

11. The method according to claim 10, wherein in each of the pulse enabled intervals, processing for the first switching period, such that a current flowing through a magnetizing inductor and a current flowing through the output inductor access to a predetermined trajectory; and processing for the final switching period, such that all pulse signals of the primary circuit is stopped when the current flowing through the magnetizing inductor is zero.

12. The method according to claim 1, wherein the first power switch is connected to a negative input end of the primary circuit, the second power switch is connected to a positive input end of the primary circuit, and when a voltage at the midpoint of the primary switching bridge arm is less than or equal to a first preset voltage, turning on the first power switch; when the voltage at the midpoint of the primary switching bridge arm is greater than or equal to a second preset voltage, turning on the second power switch.

13. The method according to claim 1, wherein the primary circuit further comprises a capacitor bridge arm formed by a first capacitor and a second capacitor connected in series, one end of the primary coil is coupled to a midpoint of the capacitor bridge arm, and the other end of the primary coil is coupled to a midpoint of the primary switching bridge arm.

14. The method according to claim 1, wherein the primary circuit further comprises a capacitor having one end coupled to a positive input end or a negative input end of the primary circuit, and the other end coupled to one end of the primary coil, and the other end of the primary coil is coupled to a midpoint of the primary switching bridge arm.

15. A converter for delivering a wide range output voltage to a load, comprising: a PWM half-bridge circuit, comprising: a primary side circuit comprising a primary switching bridge arm formed by a first power switch and a second power switch connected in series; a transformer comprising a primary coil coupled to the primary side circuit and a first secondary coil and a second secondary coil magnetically coupled to the primary coil; a secondary rectifier circuit comprising at least two synchronous rectifiers, and having an input end coupled to the secondary coil; and an output filter circuit comprising an output inductor and an output capacitor, and coupled between an output end of the secondary rectifier circuit and the load; and a control unit, wherein the control unit is configured to control the PWM half-bridge circuit to enter into a discontinuous conduction mode (DCM) by regulating a switching frequency, and in each switching period, the control unit is configured to extend conduction time of the corresponding synchronous rectifier or turn on the corresponding synchronous rectifier once again for a predetermined time before the first power switch or the second power switch are turned on, to achieve zero voltage switching (ZVS) of the first power switch and the second power switch.

16. The converter according to claim 15, wherein the secondary coil of the transformer is a central-tapped structure, and the secondary coil comprises a first end, a second end and a common end, the secondary rectifier circuit comprises a first synchronous rectifier and a second synchronous rectifier, one end of the first synchronous rectifier and one end of the second synchronous rectifier are connected to the first end and the second end of the secondary coil respectively, the other end of the first synchronous rectifier and the other end of the second synchronous rectifier are both connected to one end of the output capacitor, and one end of the output inductor is electrically connected to the common end of the secondary coil and the other end of the output inductor is electrically connected to the other end of the output capacitor.

17. The converter according to claim 16, further comprising a current detection unit for detecting a current flowing through the first synchronous rectifier and a current flowing through the second synchronous rectifier and outputting a detection result;
wherein the control unit is further configured to:
receive the detection result from the current detection unit;
in a first dead time from the first power switch being turned off to the second power switch being turned on, when the current flowing through the first synchronous rectifier is decreased to 0, keep the first synchronous rectifier in a conduction state for the predetermined time; and
in a second dead time from the second power switch being turned off to the first power switch being turned on, when the current flowing through the second synchronous rectifier is decreased to 0, keep the second synchronous rectifier in a conduction state for the predetermined time.

18. The converter according to claim 16, further comprising a current detection unit for detecting a current flowing through the first synchronous rectifier and a current flowing through the second synchronous rectifier and outputting a detection result;
wherein the control unit is further configured to:
receive a detection result from the current detection unit;
in a first dead time from the first power switch being turned off to the second power switch being turned on, when the current flowing through the first synchronous rectifier is decreased to 0, turn off the first synchronous rectifier while keep the second synchronous rectifier in a conduction state; and
in a second dead time from the second power switch being turned off to the first power switch being turned on, when the current flowing through the second synchronous rectifier is decreased to 0, turn off the second synchronous rectifier while keep the first synchronous rectifier in a conduction state.

19. The converter according to claim 18, further comprising a secondary voltage detection unit for detecting the voltage across the first synchronous rectifier and the voltage across the second synchronous rectifier;
wherein the control unit is further configured to:
when the voltage across the first synchronous rectifier reaches a m-th valley, turn on the first synchronous rectifier once again; and
when the voltage across the second synchronous rectifier reaches a m-th valley, turn on the second synchronous rectifier once again,
where m is an integer greater than or equal to 1.

20. The converter according to claim 15, wherein the secondary coil of the transformer comprises a first end and a second end, the secondary rectifier circuit comprises first to fourth synchronous rectifiers,
wherein the first synchronous rectifier and the second synchronous rectifier are connected in series to form a first rectifier bridge arm, and the third synchronous rectifier and the fourth synchronous rectifier are connected in series to form a second rectifier bridge arm,
wherein the first end and the second end of the secondary coil are connected to a midpoint of the first rectifier bridge arm and a midpoint of the second rectifier bridge arm respectively, and the output capacitor is connected in parallel to both ends of the first rectifier bridge arm and the second rectifier bridge arm through the output inductor.

21. The converter according to claim 20, wherein the control unit is further configured to:
control the first synchronous rectifier and the third synchronous rectifier to operate synchronously, and control the second synchronous rectifier and the fourth synchronous rectifier to operate synchronously;
in a first dead time from the first power switch being turned off to the second power switch being turned on, turn on the first synchronous rectifier and the third synchronous rectifier, and when currents flowing through the second synchronous rectifier and the fourth synchronous rectifier are decreased to 0, keep the second synchronous rectifier and the fourth synchronous rectifier in a conduction state for the predetermined time; and in a second dead time from the second power switch being turned off to the first power switch being turned on, turn on the second synchronous rectifier and the fourth synchronous rectifier to be turned on, and when currents flowing through the first synchronous rectifier and the third synchronous rectifier are decreased to 0, keep the first synchronous rectifier and the third synchronous rectifier in a conduction state for the predetermined time.

22. The converter according to claim 20, wherein the control unit is further configured to:

control the first synchronous rectifier and the third synchronous rectifier to operate synchronously, and control the second synchronous rectifier and the fourth synchronous rectifier to operate synchronously;

in a first dead time from the first power switch being turned off to the second power switch being turned on, turn on the first synchronous rectifier and the third synchronous rectifier, and when currents flowing through the second synchronous rectifier and the fourth synchronous rectifier are decreased to 0, turn off the second synchronous rectifier and the fourth synchronous rectifier; and in a second dead time from the second power switch being turned off to the first power switch being turned on, turn on the second synchronous rectifier and the fourth synchronous rectifier, and when currents flowing through the first synchronous rectifier and the third synchronous rectifier are decreased to 0, turn off the first synchronous rectifier and the third synchronous rectifier.

23. The converter according to claim 22, wherein the control unit is further configured to:

in the first dead time, further detecting the voltages across the second synchronous rectifier or the voltage across the fourth synchronous rectifier, and turn on the second synchronous rectifier and the fourth synchronous rectifier once again for the predetermined time when the voltage across the second synchronous rectifier or the voltage across the fourth synchronous rectifier reaches the valley; and in the second dead time, further detecting the voltage across the first synchronous rectifier or the voltage across the third synchronous rectifier, and turn on the first synchronous rectifier and the third synchronous rectifier once again for the predetermined time when the voltage across the first synchronous rectifier or the voltage across the third synchronous rectifier reaches the valley.

24. The converter according to claim 15, wherein when the load continues to decrease, the control unit is configured to control the PWM half-bridge circuit to enter into a BURST mode from the discontinuous conduction mode (DCM), wherein each BURST period comprises a pulse enabled interval during which the PWM half-bridge circuit operates in the DCM, and a pulse disabled interval during which all pulse signals are stopped and the PWM half-bridge circuit stops operation.

25. The converter according to claim 24, wherein in each of the pulse enabled intervals, the control unit processes for the first switching period, such that a current flowing through a magnetizing inductor and a current flowing through the output inductor access to a predetermined trajectory; processes for the final switching period, such that a pulse signal of the primary circuit is stopped when the current flowing through the magnetizing inductor is zero.

26. The converter according to claim 15, further comprising a primary voltage detection unit for detecting a midpoint voltage of the primary switching bridge arm and outputting a detection result;

wherein the first power switch is electrically connected to a negative input end of the primary circuit, and the second power switch is electrically connected to a positive input end of the primary circuit;

wherein the control unit is further configured to:

receive the detection result from the primary voltage detection unit;

turn on the first power switch, when a midpoint voltage of the primary switching bridge arm is less than or equal to a first preset voltage; and turn on the second power switch, when a midpoint voltage of the primary switching bridge arm is greater than or equal to a second preset voltage.

27. The converter according to claim 15, wherein the primary circuit further comprises a capacitor bridge arm formed by a first capacitor and a second capacitor connected in series, one end of the primary coil is coupled to a midpoint of the capacitor bridge arm, and the other end of the primary coil is coupled to a midpoint of the primary switching bridge arm.

28. The converter according to claim 15, wherein the primary circuit further comprises a capacitor having one end coupled to a positive input end or a negative input end of the primary circuit, and the other end coupled to one end of the primary coil, and the other end of the primary coil is coupled to a midpoint of the primary switching bridge arm.

29. The converter according to claim 15, wherein the output inductor and the transformer are an integrated magnetic element.

30. The converter according to claim 15, wherein the PWM half-bridge circuit works in the discontinuous conduction mode at a light load.

31. The converter according to claim 15, wherein the PWM half-bridge circuit works in the continuous conduction mode at a heavy load.

32. The converter according to claim 15, wherein the PWM half-bridge circuit works in the discontinuous conduction mode at a full-range load.

* * * * *